US005117298A

United States Patent [19]

Hirai

[11] Patent Number: 5,117,298

[45] Date of Patent: May 26, 1992

[54] ACTIVE MATRIX LIQUID CRYSTAL DISPLAY WITH REDUCED FLICKERS

[75] Inventor: Yoshihiko Hirai, Tokyo, Japan

[73] Assignee: NEC Corporation, Tokyo, Japan

[21] Appl. No.: 407,429

[22] Filed: Sep. 14, 1989

[30] Foreign Application Priority Data

| | | | |
|---|---|---|---|
| Sep. 20, 1988 | [JP] | Japan | 63-237034 |
| Sep. 20, 1988 | [JP] | Japan | 63-237035 |
| Dec. 22, 1988 | [JP] | Japan | 63-325210 |
| Dec. 23, 1988 | [JP] | Japan | 63-326844 |

[51] Int. Cl.[5] .......... G02F 1/13

[52] U.S. Cl. .......... 359/55; 359/60; 340/784

[58] Field of Search .......... 350/333, 332, 350 S

[56] References Cited

U.S. PATENT DOCUMENTS

| | | | |
|---|---|---|---|
| 4,773,716 | 9/1988 | Nakanowatari | 350/332 |
| 4,840,462 | 6/1989 | Hartmann | 350/350 S |
| 4,904,057 | 2/1990 | Sakayori et al. | 350/333 |
| 4,909,607 | 3/1990 | Ross | 350/332 |

*Primary Examiner*—Andrew J. James
*Assistant Examiner*—Sara W. Crane
*Attorney, Agent, or Firm*—Leydig, Voit & Mayer

[57] ABSTRACT

A liquid crystal display includes liquid crystal display pixels, thin film diodes that are connected respectively to the liquid crystal display pixels, a plurality of rows of scan lines connected to the liquid crystal display pixels, data lines connected to the liquid crystal display pixels via the thin film diodes, and means for supplying a signal voltage, between the scan line and the data line, that changes its polarity for each frame, and has an absolute value that is different for different polarity. By varying the absolute value of the signal voltage that is applied between the scan line and the data line corresponding to different polarity, the asymmetry that exists in the thin film diode can be compensated.

11 Claims, 6 Drawing Sheets

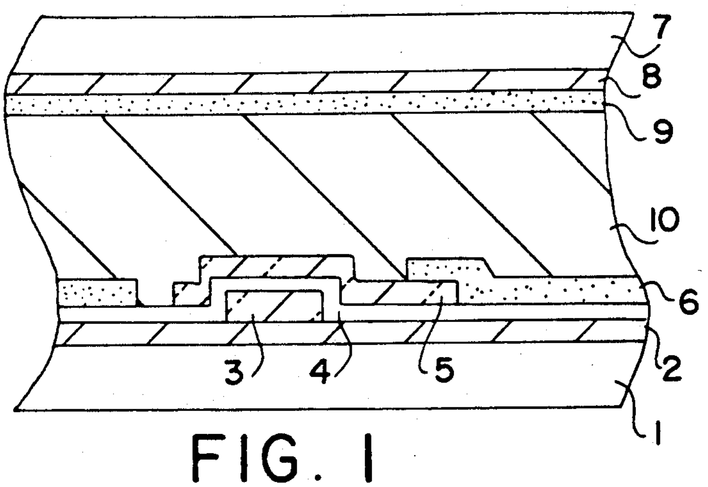
FIG. 1
FIG. 2
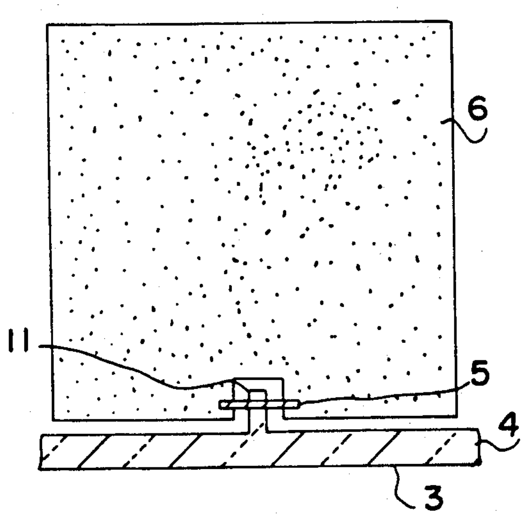
FIG. 3
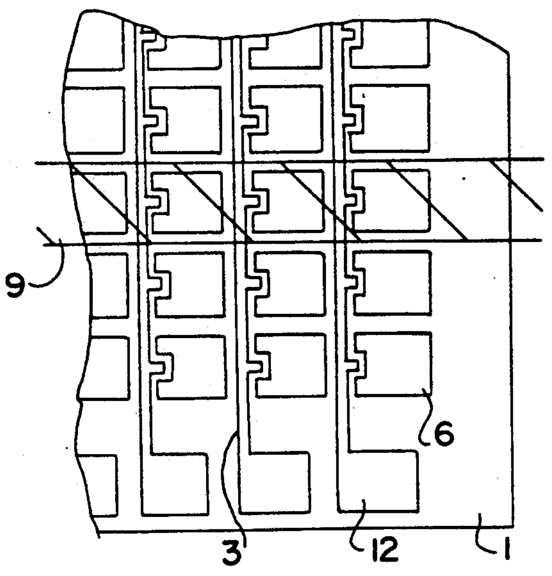

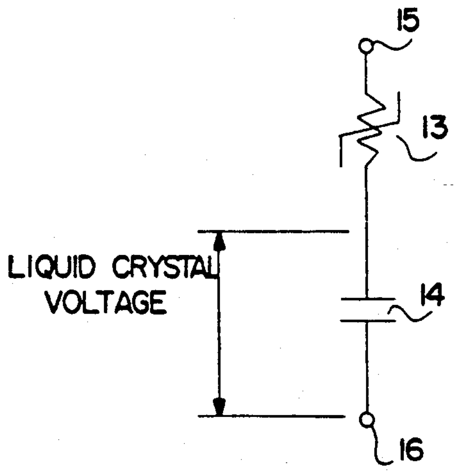
FIG. 4
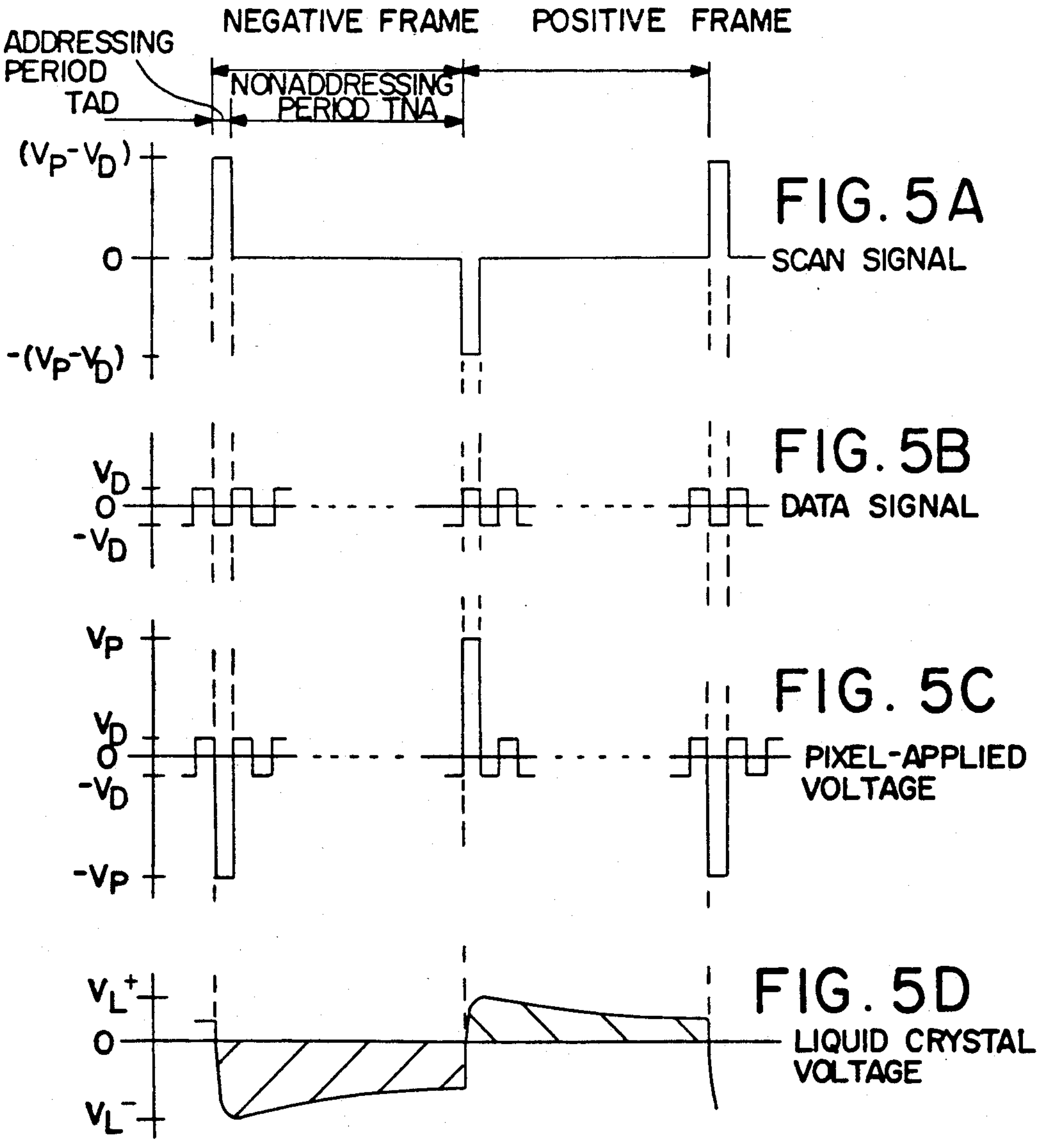
FIG. 5A
FIG. 5B
FIG. 5C
FIG. 5D

ACTIVE MATRIX LIQUID CRYSTAL DISPLAY WITH REDUCED FLICKERS

BACKGROUND OF THE INVENTION

1. Field of the Invention

The present invention relates to an active matrix liquid crystal display, and more particularly to an active matrix liquid crystal display using a nonlinear resistance element.

2. Description of the Related Art

In recent years, applications of liquid crystal displays (LCDs) centered around those of twisted nematic (TN) type have become wide spread, with a large quantity of them being utilized in the fields of wrist watches and hand calculators. On top of it, matrix type displays that can handle arbitrary display of such items as characters and graphics have also been finding their ways into industrial applications. In order to expand the application field for the matrix type LCDs, it is necessary to increase their display capacity. However, the rise of the curve for the voltage versus transmissivity characteristic is not steep enough so that, if the number of scanning lines for multiplexed drive is increased in order to enhance the display capacity, the ratio of the effective voltages that are applied respectively to a selected pixel and a nonselected pixel is reduced which gives rise to a crosstalk of an increase in the transmissivity of the selected pixel and a decrease in the transmissivity of the nonselected pixel. As a result, there is created a marked decrease in the display contrast, and the angle of visibility for which a reasonable contrast can be obtained becomes narrowed down conspicuously. For this reason, a limit of about 60 lines for the scanning lines existed in the conventional LCDs. The conventional LCD of the above kind will be referred to as a simple matrix LCD.

Now, in order to sharply increase the display capacity of a matrix type LCDs, there has been disclosed an active matrix LCD in which a switching element is arranged in series to each pixel of the LCD. As the switching element of the experimental models of active matrix LCDs announced so far, use has mostly been made of a thin film transistor (TFT) having amorphous silicon or polycrystalline silicon as the semiconductor material. On the other hand, active matrix LCDs which make use of a thin film diode (referred to as TFD hereinafter) are also drawing attention for the reason that there can be expected a simplification of the manufacturing process, an improvement in the yield and a reduction in the cost due to relatively simple manufacturing method and device structure.

Out of such thin film two-terminal element type active matrix LCD (abbreviated as TFD-LCD hereinafter), the LCD which is considered to be the closest to the practical use is that which uses a metal-insulator-metal element (abbreviated as MIM hereinafter) as the TFD. Besides MIM, a diode ring in which two amorphous pin diodes are connected in parallel with their polarities reversed to each other and a back-to-back diode in which two pin diodes are connected in series with their polarities reversed, are known as TFDs.

All of the TFDs mentioned in the above are nonlinear resistance elements in which the current increases rapidly in nonlinear fashion as the voltage applied across the ends of the element is increased. By connecting such a TFD to a liquid crystal body in series, the rise of the curve for the voltage versus transmissivity characteristic becomes steep, which makes it possible to increase the number of scanning lines.

Prior examples of LCDs that make use of such MIMs are described representatively in D. R. Baraff et al., "The Optimization of Metal-Insulator-Metal Nonlinear Devices for Use in Multiplexed Liquid Crystal Displays," IEEE Trans. Electron Devices, Vol. ED-28, pp. 736–739 (1981) and in Shinji Morozumi et al., "250×240 Element LCD Addressed by Lateral MIM," Technical Report of Television Society (IPD 83-8), pp. 39–44, (issued in Dec., 1983). In addition, in patent publication gazette, they are disclosed representatively in Japanese Patent Laid Open, Gazette No. 52-149090 and Japanese Patent Laid Open, Gazette No. 55-161273 with details on the principle of operation.

In MIMs, the oxide or nitride of tantalum (Ta) or silicon is mainly used as the material for the insulator layer. Further, although almost any metal can be used as the metal in MIMs, chromium or tantalum is mainly made use of.

Out of various analytical expressions that can be employed to represent the current versus voltage (I-V) characteristic of a nonlinear resistance element, the following is known as a representative formula:

$$I = A \cdot V^{\alpha} \quad (1)$$

In the above expression, I is the current, V, the voltage, $\alpha$, a nonlinear coefficient and A is a proportionality constant. In the MIMs mentioned earlier, the value of $\alpha$ is 6 or greater.

Referring to FIG. 1 and FIG. 2, in a TFD-LCD, a salient electrode that is connected to a lead electrode 3 is provided on a lower glass substrate 1, an insulator film 4 is provided on the salient electrode 11, an upper electrode 5 is provided on the insulator film 4, where the upper electrode 5 is connected to a lower transparent electrode 6 which is to become a pixel On the opposite side of the lower glass substrate 1 there is disposed an upper glass substrate 7, an upper transparent electrode 9 is provided thereon, and a liquid crystal layer 10 is inserted between the lower glass substrate 1 and the upper glass substrate 7. A TFD is formed by the salient electrode 11, the insulator film 14 and the upper electrode 5.

Referring to FIG. 3, the lower transparent electrodes 6 are arranged in a lattice form, and the lower transparent electrodes 6 are joined vertically by the lead electrode 3. The upper transparent electrode 9 is provided so as to join the pixels horizontally and a pixel is formed where a lower transparent electrode 6 and an upper transparent electrode 9 are overlapped. Normally, the upper transparent electrode 9 is used as a scan signal line while the lead electrode 3 is used as a data signal line, but there may be found cases where their roles are interchanged.

An equivalent circuit for one pixel of a TFD-LCD panel may be represented in the form as shown in FIG. 4 in which a TFD 13 and a liquid crystal element 14 are connected in series, and a data signal line 15 and a scan signal line 16 are connected on both ends.

A data signal and a scan signal are applied to the data signal line 15 and the scan signal line 16, respectively, and the difference between these signal voltages becomes a voltage to be applied to the pixel. A specified row is selected by the scan signal, and only a pixel in that row to which is applied a selection signal becomes a displayable state.

FIG. 5 shows a case in which the pixel under discussion is a selected pixel, and drive signals where selected pixels and nonselected pixels exist atternately on the data signal line 15. The scan signal (a) and the data signal (b) take on the values as shown in Table 1 below in each of the positive and negative frames.

TABLE 1

| | | Negative Frame | Positive Frame |
|---|---|---|---|
| Scan Signal | Addressed Period | $V_P - V_D$ | $-(V_P - V_D)$ |
| | Nonaddressed Period | 0 | 0 |
| Data Signal | Selected Pixel | $-V_D$ | $V_D$ |
| | Nonselected Pixel | $V_D$ | $-V_D$ |

Here, the reason for inverting the polarity of the voltage applied to the liquid crystal between a negative and a positive values for each frame is for preventing deterioration of the liquid crystal layer. Further, the reason for applying a scan signal ($V_P$-$V_D$) is for making the voltage applied to the selected pixel to be $V_P$. One picture is scanned by each one of negative and positive frame, and the display contents are written in. The addressing period $T_{Ad}$ is the writing interval, and the nonaddressing period $T_{NA}$ is the charge-holding interval. The ratio $V_D/V_P$ of $V_D$ to $V_P$ is called the bias ratio which normally takes on a constant value.

A voltage (c) applied to a pixel (or pixel-applied voltage) is (data signal) minus (scan signal) which takes on the value shown in Table 2.

TABLE 2

| Pixel-Applied Voltage | | Scan Signal: Addressed Period | Scan Signal: Nonaddressed Period |
|---|---|---|---|
| Data Signal | Selected Pixel | $-V_P$ | $[-V_D]$ |
| | | $V_P$ | $[V_D]$ |
| | Nonselected Pixel | $-(V_P - 2V_D)$ | $[V_D]$ |
| | | $V_P - 2V_D$ | $[-V_D]$ |
| | Note | The upper line is for the negative frame, and the lower line is for the positive frame. | |

The liquid crystal voltage (d) varies corresponding to the values of the voltage signal (c), generating a display contrast. Note that what is meant by the liquid crystal voltage is the voltage applied across the ends of the liquid crystal element. It should be noted that all the values for the nonaddressed period in Table 2 are given within square brackets. The meaning for this is that the voltage applied to the pixel takes on the value within the brackets depending upon the content of the data signal is selected or nonselected. The I-V characteristic of a nonlinear element should ideally be symmetric with respect to the positive and negative signs of the voltage. In an actual MIM, however, asymmetry is fairly significant as can be seen from FIG. 6. Namely, there are many cases in which the value $A^+$ of A in Eq. (1) for $V>O$ and the value $A^-$ of A for $V<O$ are different, although $\alpha$ remains the same. When $A^->A^+$ holds, the absolute value of the voltage applied to the liquid crystal layer is larger for the negative frame than for the positive frame. Since the liquid crystal contrast is determined by the effective value of the liquid crystal voltage (d), flicker of the screen becomes more noticeable in such a case.

SUMMARY OF THE INVENTION

Accordingly, an object of the present invention is to provide an active matrix type liquid crystal display using a nonlinear element which will not give rise to flickers.

An active matrix liquid crystal display of the present invention may comprise a plurality of lower electrodes arranged in a matrix form, thin film diodes connected respectively to the lower electrodes, and a plurality of columns of lead electrodes connected respectively to the lower electrodes in each column via the respective thin film diodes. The display further comprises a plurality of rows of upper electrodes provided respectively over the lower electrodes in each row, wherein the upper electrode or the lower electrode serves as a scan line, and a liquid crystal layer inserted between the lower electrodes and the upper electrodes. In addition, the display comprises a driving circuit for applying a signal between the lead electrode and the upper electrode, wherein the polarity of the signal is inverted for every predetermined number of scanning lines and an absolute value of the signal is different for positive polarity and for negative polarity. The driving circuit includes a controller, a first voltage generator, a second voltage generator, a scan signal circuit, and a data signal circuit. The controller generates a frame signal and the first voltage generator generates first and second voltages in response to the frame signal, the first voltage being different from the second voltage. The second voltage generator generates first and second scan signals and first and second data signals in response to the first voltage generated by the first voltage generator. The second voltage generator also generates third and fourth scan signals and third and fourth data signals in response to the second voltage generated by the first voltage generator. The first and third scan signals are signals which select the scan lines, and the second and fourth scan signals are signals which do not select scan lines. The first and third data signals are signals which select the pixels, and the second and fourth data signals are signals which do not select pixels. The sign of a first signal voltage which is obtained by subtracting the first data signal from the first scan signal, is opposite to the sign of a second signal voltage, which is obtained by subtracting the third data signal form the third scan signal, and the absolute value of the first signal voltage is different from the absolute value of the second signal voltage. The scan signal circuit responds to the frame signal by applying the scan signal to one of the upper electrode and the lead electrode, whichever is used as the scan line. The data signal circuit responds to the frame signal by applying the data signal to the other of the upper electrode and the lead electrode, whichever is used as a data line.

A liquid crystal display of the present invention may also comprise a plurality of rows of scan lines and a plurality of columns of data lines that intersect the plurality of rows of scan lines, the intersections being arranged in a lattice form. The display further comprises liquid crystal display pixels respectively provided in the vicinity of each intersection. Each of the liquid crystal display pixels includes a non-linear resistance element connected to a data line, a lower electrode connected to the non-linear resistance element, and a liquid crystal provided between the scan line and the lower electrode. In addition, the display comprises scan signal circuitry for supplying first, second, third, and fourth scan signals to the scan lines and data signal circuitry for supplying first, second, third, and fourth data signals to the data lines. The first and third scan signals are signals that select the scan lines and the second and fourth signals are signals which do not select scan lines. The first and third data signals are signals that select liquid crystal display pixels and the second and fourth data signals are signals which do not select liquid crystal display pixels. The sign of a first signal voltage, which is obtained by subtracting the first data signal from the first scan signal, is opposite to the sign of a second voltage, which is obtained by subtracting the third data signal from the third scan signal, and the absolute value of the first signal voltage is different from the absolute value of the second signal voltage. The first and second scan signals and the first and second data signals are supplied in response to a fifth scan signal that scans a predetermined number of first scan lines, a third and fourth scan signals and a third and fourth data signals are supplied in response to a sixth scan signal that scans a predetermined number of second scan lines, and the fifth scan signal and the sixth scan signal are supplied alternately.

The embodiments of the present invention offer many advantages. For example, even when there exists asymmetry in a TFD with respect to the positive and negative polarities, it is possible to symmetrize the voltages applied to the liquid crystal layer for the positive and negative polarities and, hence, to eliminate flickers. The voltages are symmetrized by applying signals between the lead electrodes and the upper electrodes, the signals having different absolute values for the positive and negative polarities so as to cancel the asymmetry.

The polarity of the signal voltage applied between the lead electrode and the upper electrode is normally inverted for every frame. The drive signals in the case where the polarity is inverted for every frame are shown in FIG. 7. It is basically the same as the method shown in FIG. 5, only difference being that the absolute value of the pixel-applied voltage (c) which is the difference between the scan signal (a) and the data signal (b) is modified. Namely, the value of $V_P$ is modified to $V_P$ and $V_P'$ for the positive and negative frames, respectively, and the value of $V_D$ is similarly modified to $V_D$ and $V_D'$. Then, assuming that $A^- < A^+$ holds, it becomes possible to equalize the absolute values of the liquid crystal voltage (d) between the positive and the negative frames by setting $V_P > V_P'$ and $V_D > V_D'$. The values of the liquid crystal voltage (d) are summarized in Table 3 below.

TABLE 3

| | | Negative Frame | Positive Frame |
|---|---|---|---|
| Scan Signal | Addressed Period | $V_P - V_D$ | $-(V_P' - V_D')$ |
| | Nonaddressed Period | 0 | 0 |
| Data Signal | Selected Pixel | $-V_D$ | $V_D'$ |
| | Nonselected Pixel | $V_D$ | $-V_D'$ |

Normally, the bias ratio is set equal for the positive and the negative frames ($V_D/V_P = V_D'/V_P'$), but this is not essential.

By adjusting the ratios of the absolute value of the pixel-applied voltage for the positive and the negative frames, $V_P/V_P'$ and $(V_P' - 2V_D')$, it is possible to find out ratios for which flickers can be eliminated. This ratio will be referred to as the optimum ratio for display. When the bias ratio is constant, one only needs to set $V_P/V_P'$ as the optimum ratio for display.

The pixel-applied voltage (c) is defined as (data signal)−(scan signal) which is summarized in Table 4 below.

TABLE 4

| Pixel-Applied Voltage | | Scan Signal: Addressed Period | Scan Signal: Nonaddressed Period |
|---|---|---|---|
| Data Signal | Selected Pixel | $-V_P$<br>$V_P'$ | $[-V_D]$<br>$[V_D']$ |
| | Nonselected Pixel | $-(V_P - 2V_D)$<br>$V_P' - 2V_D'$ | $[V_D]$<br>$[-V_D']$ |
| Note | | Top line is for the negative frame, and bottom line is for the positive frame. | |

Further, when the driving voltage is raised to increase the pixel-applied voltage in the adjustment to set the optimum ratio for display, the liquid crystal molecules are raised sufficiently well and cause flickers to tend less easily recognized, with a result that setting to the optimum ratio for display being made more difficult.

In such a case, adjustment needs be performed in the region where the rise of the liquid crystal molecules is not sufficient yet so that the flickers are observable most violently by reducing the driving voltage to some extent. According to this method, assuming that the bias ratio is constant, it is easy to find out an optimum ratio for display with no flickers by adjusting the ratio of the absolute values of the pixel-applied voltage for the positive and the negative frames. Although the magnitude of flickers can readily be judged visually, to be more exact one may adopt a method in which light that transmitted through the panel is received by a photodiode, amplified and then analyzed with a spectral analyzer. However, there is not a significant difference between the results by these two methods.

Besides the above, there has already been proposed a method of inverting the signal polarity every one or two scanning lines in order to suppress the flickers. This is a method in which the driving voltages shown in Table 1 and Table 5 are alternately applied every one or two lines and the pixel-applied voltage becomes as shown in Table 2 and Table 6, so that the flickers look as if they are cancelled in the area of several pixels. However, the suppression of flickers by this method is incomplete with a certain degree of flickers still persisting.

TABLE 5

| | | Negative Frame | Positive Frame |
|---|---|---|---|
| Scan Signal | Addressed Period | $-(V_P - V_D)$ | $V_P - V_D$ |
| | Nonaddressed Period | 0 | 0 |
| Data Signal | Selected Pixel | $V_D$ | $-V_P$ |
| | Nonselected Pixel | $-V_D$ | $V_P$ |

TABLE 6

| Pixel-Applied Voltage | | Scan Signal: Addressed Period | Scan Signal: Nonaddressed Period |
|---|---|---|---|
| Data Signal | Selected Pixel | $V_P$<br>$-V_P$ | $[V_D]$<br>$[-V_D]$ |
| | Nonselected Pixel | $V_P - 2V_D$<br>$-(V_P - 2V_D)$ | $[-V_D]$<br>$[V_D]$ |
| Note | | The upper line is for the negative frame, and the lower line is for | |

TABLE 6-continued

| Pixel-Applied Voltage | Scan Signal Addressed Period | Scan Signal Nonaddressed Period |
|---|---|---|
| | the positive frame. | |

In the case of inverting the polarity every one or two scanning lines, it is also possible to eliminate flickers by changing the absolute value of the signal voltage to be applied between the lead electrode and the upper electrode corresponding to the polarity. The driving method for such a case is similar to the case of changing the polarity every frame shown in FIG. 7, except that the polarity is inverted every one or two scanning lines. That is to say, the driving voltages shown in Table 3 and Table 7 are applied alternately every one or two scanning lines.

With the driving voltages of Table 3 and Table 7, the pixel-applied voltages become as shown in Table 4 and Table 8, respectively.

TABLE 7

| | | Negative Frame | Positive Frame |
|---|---|---|---|
| Scan | Addressed Period | $-(V_P - V_D)$ | $V_{P'} - V_{D'}$ |
| Signal | Nonaddressed Period | 0 | 0 |
| Data | Selected Pixel | $V_D$ | $-V_{D'}$ |
| Signal | Nonselected Pixel | $-V_D$ | $V_{D'}$ |

TABLE 8

| Pixel-Applied Voltage | | Scan Signal Addressed Period | Scan Signal Nonaddressed Period |
|---|---|---|---|
| Data | Selected Pixel | $V_P$ | $[V_D]$ |
| Signal | | $V_{P'}$ | $[-V_{D'}]$ |
| | Nonselected Pixel | $V_P - 2V_D$ | $[-V_D]$ |
| | | $-(V_{P'} - 2V_{D'})$ | $[V_{D'}]$ |
| | Note | The upper line is for the negative frame, and the lower line is for the positive frame. | |

BRIEF DESCRIPTION OF THE DRAWINGS

The above and the further objects, features and advantages of the present invention will become more apparent from the following detailed description taken in conjunction with the accompanying drawings, wherein:

FIG. 1 is a sectional diagram for explaining the MIM-LCD panel;

FIG. 2 is a plan view for explaining one pixel of the MIM-LCD panel;

FIG. 3 is a plan view for explaining the MIM-LCD panel;

FIG. 4 is an equivalent circuit diagram for one pixel of the MIM-LCD panel;

FIGS. 5A-5D are diagrams for explaining the conventional driving method of the MIM-LCD;

DESCRIPTION OF THE PREFERRED EMBODIMENTS

First Embodiment

Figure 6:
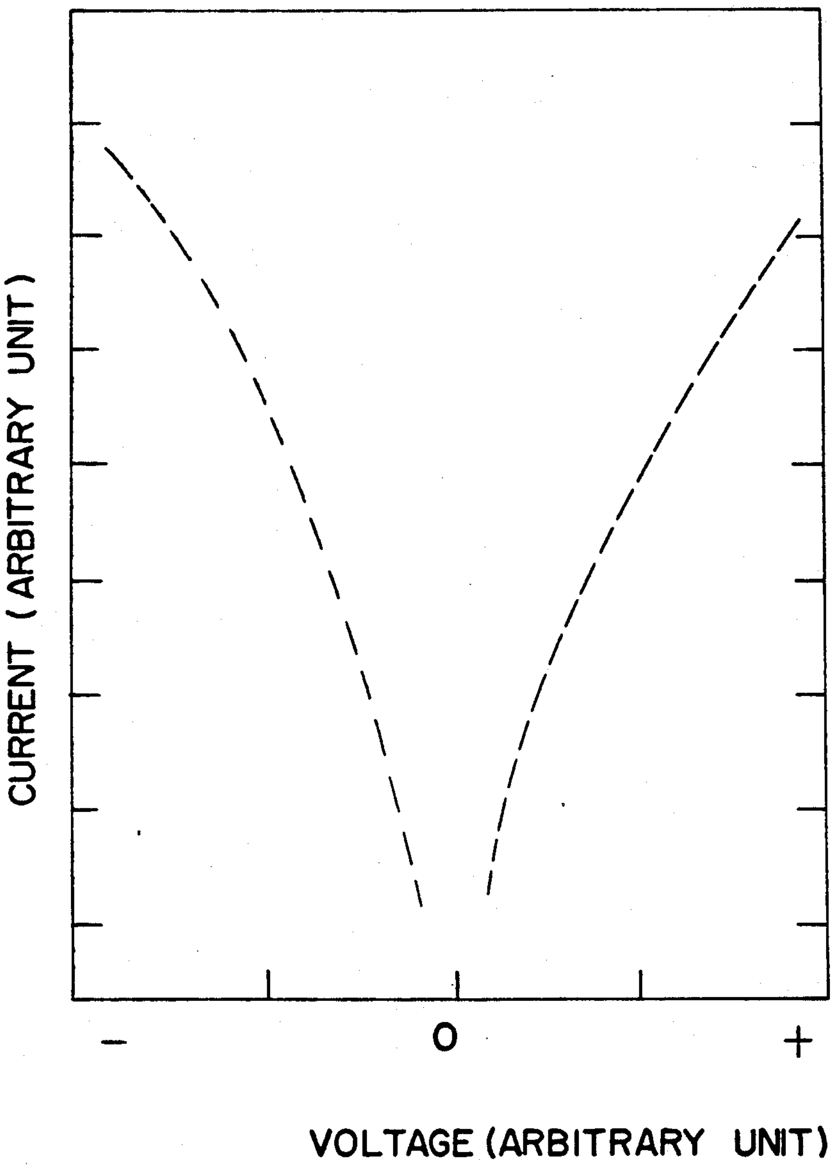
FIG. 6 is a diagram for explaining the current versus voltage (I-V) characteristic.
Figures 7A, 7B, 7C, 7D:
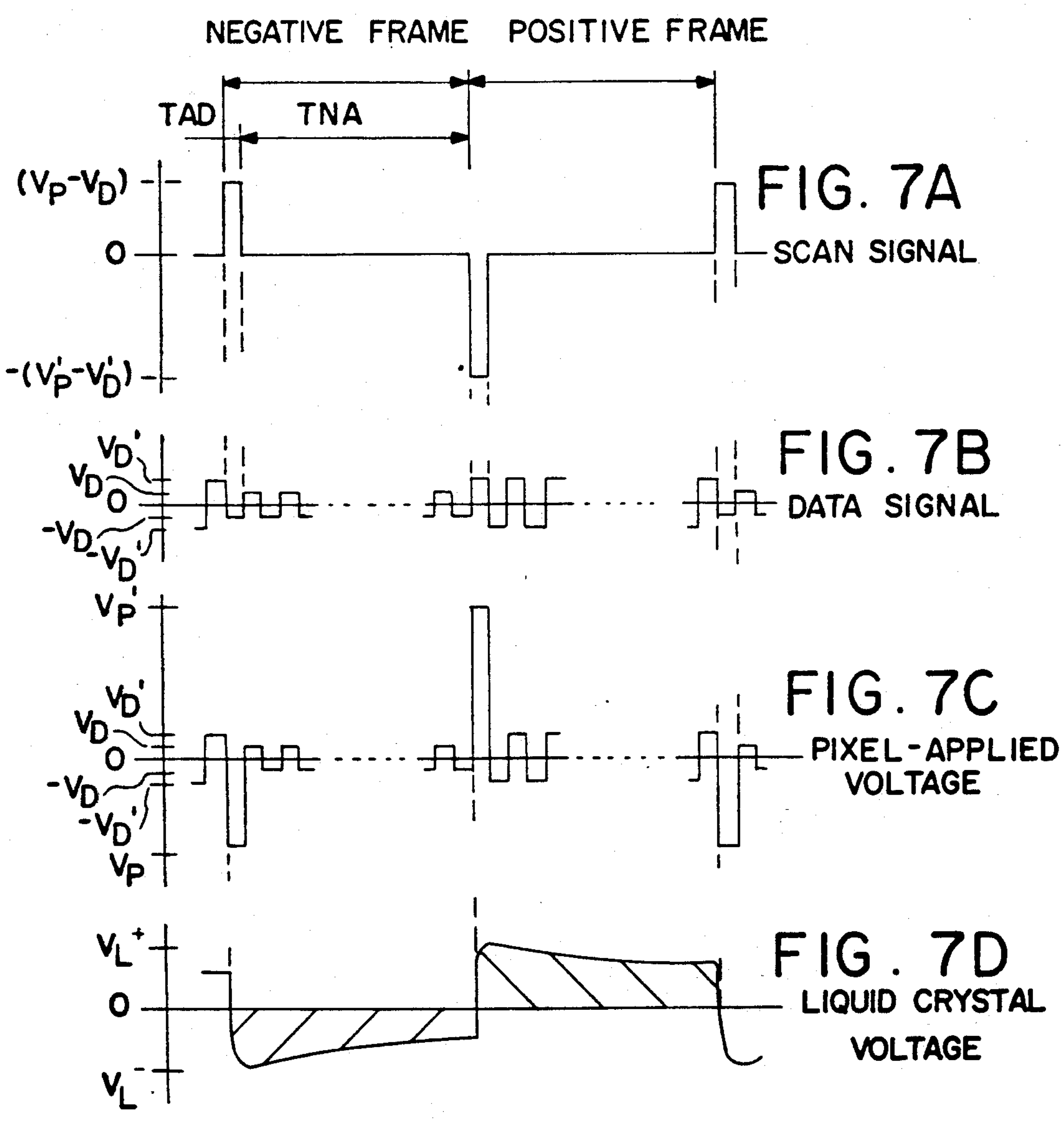
FIGS. 7A-7D are diagrams for explaining the driving method of the MIM-LCD of the present invention.

The driving method for this embodiment is substantially the same as the method shown in FIG. 7. However, in the driving method shown in FIG. 7, both of the scan signal (a) and the data signal (b) are swinging with 0 V as the center (this voltage will be referred to as the center voltage). Accordingly, there are required both of the positive and negative power supplies which makes the situation complicated. In this case, it is possible to reduce the number of power supplies needed by changing the center voltages of the scan signal and the data signal without changing the liquid crystal voltage in FIG. 7 as a potential difference (the so-called phase difference driving method). An example of such a method is shown in Table 9 that follows. Namely, there are many cases in which the voltage V5 in the table is set to 0 V (GND), but it is of course possible to set it to an arbitrary other voltage. In order to realize the driving method shown in FIG. 7 and Table 3, it is only necessary to set $V_{LCD}=V_P$, $V_{LCD'}=V_{P'}$, $V_1'=V_p'-V_{D'}$, $V_2'=V_{P'}-2V_{D'}$, $V_3=2V_D$, $V_4=V_D$, and $V_5=0$.

TABLE 9

| | | Negative Frame | Positive Frame |
|---|---|---|---|
| Scan | Addressed Period | $V_{LCD}$ | $V_5$ (GND) |
| Signal | Nonaddress Period | $V_4$ | $V_1'$ |
| Data | Selected Pixel | $V_5$ (GND) | $V_{LCD'}$ |
| Signal | Nonselected Pixel | $V_3$ | $V_2'$ |
| | Frame Signal | L | H |

Figure 8:
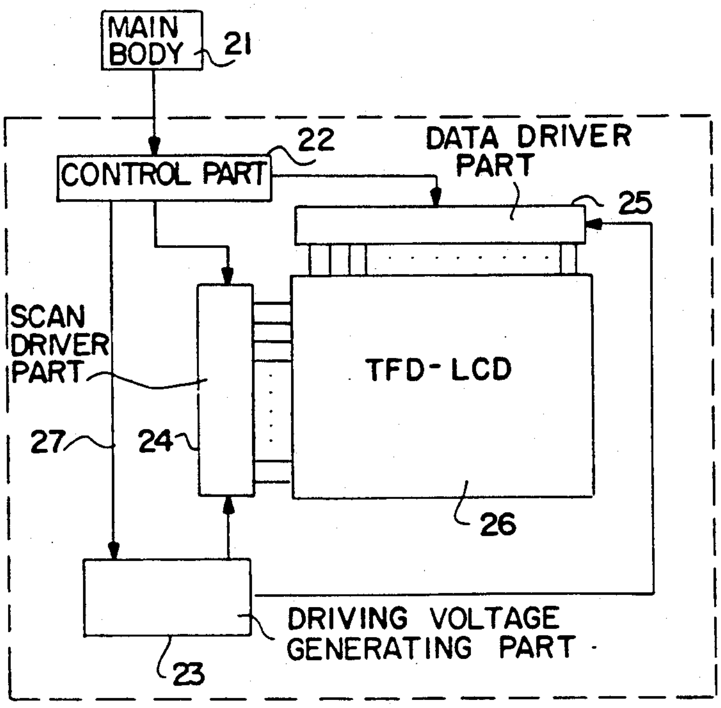
FIG. 8 is a block diagram for explaining the liquid crystal display of a first embodiment of the present invention.

Referring to FIG. 8, the liquid crystal display of the present embodiment includes a control part 22, a driving voltage generating part 23, a scan driver part 24, a data driver part 25 and a liquid crystal display panel 26. A main body 21 is, for example, a personal computer or a television circuit. Upon receipt of a display signal from the main body 21, the control part 22 converts the signal to control signals for drivers of TFD-LCD, and sends them to the scan driver part 24 and the data driver part 25. With the signals from the control part 22, the scan driver part 24 and the data driver part 25 apply the voltages $V_{LCD}$, $V'_{LCD}$, $V_1$, $V_2$, $V_3$ and $V_4$ following the signals from the driving voltage generating part 23 in accordance with Table 9. As shown in Table 9, frame signals are output corresponding to the negative and positive frames to the scan driver part 24 and the data driver part 25 from the control part 22. These signals are logic levels, and L (low level) and H (high level) in Table 3 may of course be interchanged.

The driving circuit of the present embodiment is characterized in that the voltages $V_{LCD}$, $V_{LCD'}$, $V_1$, $V_2$, $V_3$ and $V_4$ from the driving voltage generating part 23 are changed for the positive and the negative frames by the frame signal 27 from the control part 22. Such an operation is realized by a power frame switching circuit 31 in the driving voltage generating part 23 shown in FIG. 9.

By the use of driving waveforms as in the above, the absolute value of the pixel-applied voltage which is the difference between the scan signal and the data signal can be set independently for each frame, which makes it possible to keep the effective value of the liquid crystal voltage VL at the same value between the frames. In this way, it becomes possible to obtain a TFD-LCD which is free from flickers.

Figure 9:
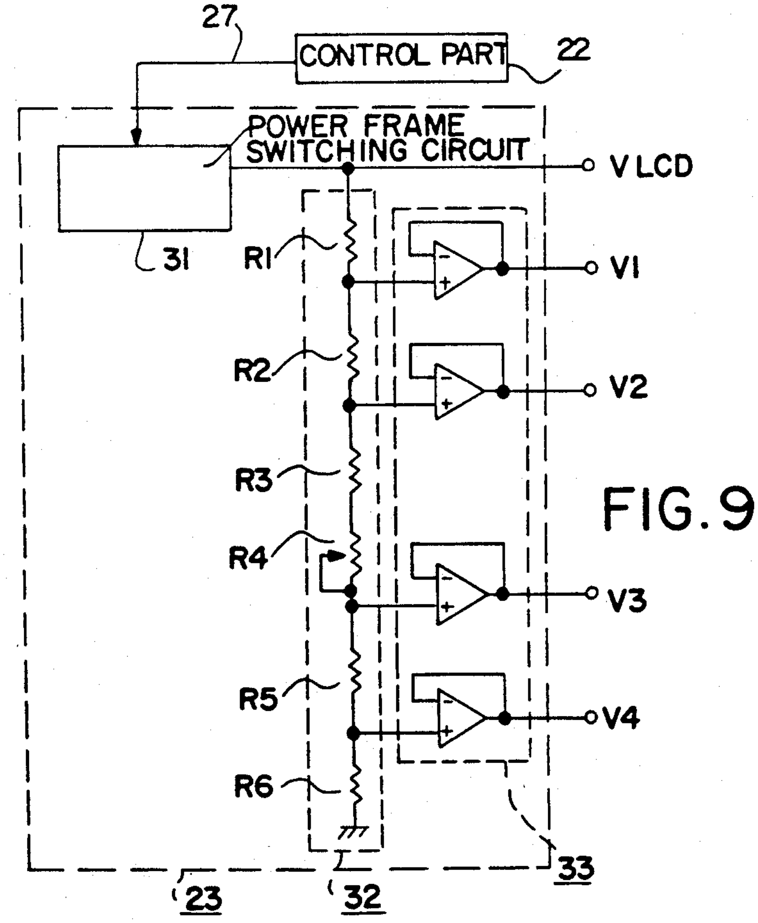
FIG. 9 is a circuit diagram for explaining the driving voltage generating part of the first embodiment of the present invention.

Referring to FIG. 9, the driving voltage generating part 23 obtains voltages $V_1$, $V_2$, $V_3$ and $V_4$ by dividing the voltage $V_{LCD}$ with resistors $R_1$, $R_2$, $R_3$, $R_4$, $R_5$ and $R_6$ in a voltage dividing circuit 32. These voltage levels are current-amplified in an amplifier circuit 33 to be applied to the scan driver part 24 and the data driver part 25. The voltage $V_{LCD}$ is set to different values for the positive and the negative frames by the frame signal 27 from the control part 22. A circuit which performs such a function is the power frame switching circuit 31.

Normally, use is made of $R_1$, $R_2$, $R_3$, $R_5$ and $R_6$ that have an equal fixed resistance and $R_4$ that has a semi-fixed resistance, but it is not necessary to be limited to such an arrangement. As an example, one may take the case where the fixed resistance for resistors $R_1$–$R_3$, $R_5$ and $R_6$ is 3 Ω and the semi-fixed resistance of the resistor $R_4$ is 50 Ω.

Further, for the amplifier circuit 33 use is made of a voltage follower circuit which employs operational amplifiers, but it does not have be limited to such a choice. The operational amplifier is a differential amplifier with high input impedance and high gain.

Figure 10:
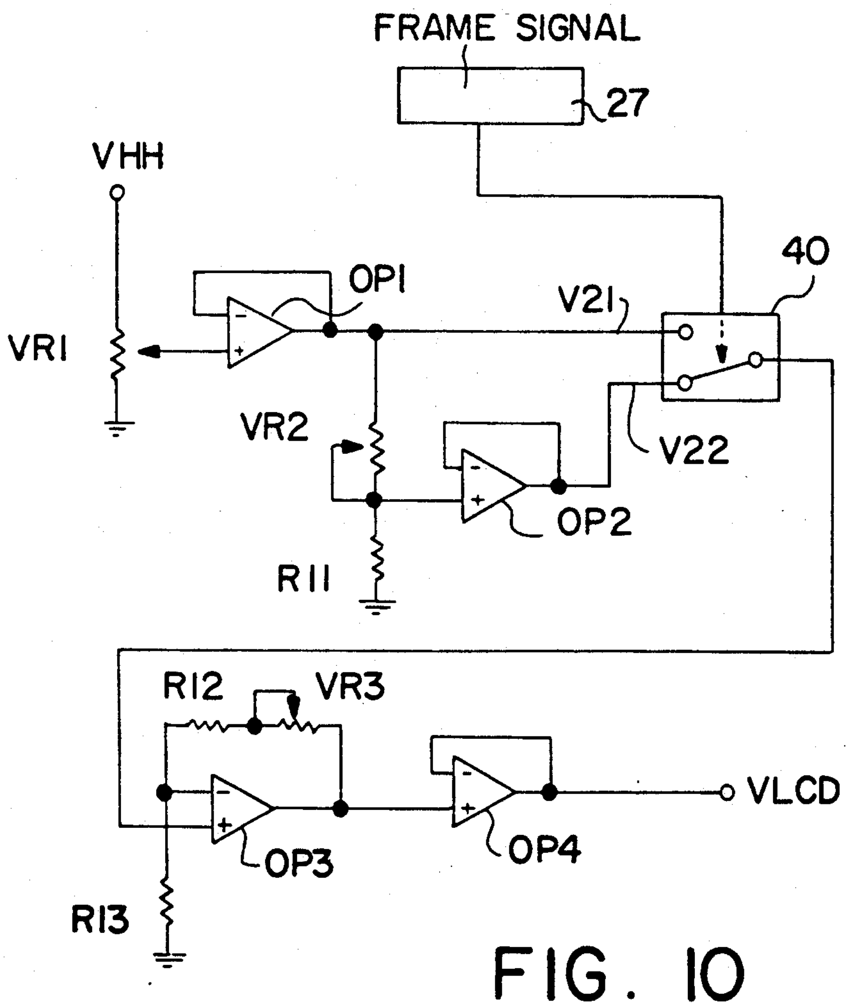
FIG. 10 is a circuit diagram for explaining the switching circuit of the power source frame for the first embodiment of the present invention.

The power frame switching circuit 31 of the present embodiment is shown in FIG. 10. In the figure, $OP_1$, $OP_2$, $OP_3$ and $OP_4$ are operational amplifiers, $VR_1$, $VR_2$ and $VR_3$ are semi-fixed or variable resistors, and $R_{11}$, $R_{12}$ and $R_{13}$ are fixed resistors.

The voltage $V_{LCD}$ is arranged to take the absolute value of $V_{11}$ and $V_{12}$ for the positive and the negative frames, respectively ($V_{11} > V_{12}$). A voltage $V_{21}$ is set by the resistor $VR_1$. The voltage level $V_{21}$ is current-amplified by the operational amplifier $OP_1$ similar to the amplifier circuit 33 shown in FIG. 9. A voltage $V_{22}$ is set by dividing the voltage $V_{21}$ with the resistors $VR_2$ and $R_{11}$. The voltage $V_{22}$ is current-amplified with the operational amplifier $OP_2$. The voltages $V_{21}$ and $V_{22}$ are switched by the analog switch 40 according to the frame signal 27. The signal that takes on the voltages $V_{21}$ and $V_{22}$ for the respective frames is voltage-amplified by the operational amplifier $OP_3$, and current-amplified by the operational amplifier $OP_4$.

Representative constants for the various circuits are as follows. Namely, $VR_1 = 10$ Ω, , $VR_2 = 10$ Ω, $VR_3 = 50$ Ω, $R_{11} = 4.7$ Ω, $R_{12} = 47$ Ω and $R_{13} = 10$ Ω. For the operational amplifiers $OP_;$, $OP_2$, $OP_3$ and $OP_4$, use is made of ordinary IC operational amplifiers, but those with high breakdown strength are preferred for the operational amplifiers $OP_3$ and $OP_4$. In addition, about 5 V is appropriate for the voltage $V_{HH}$.

In FIG. 10, the operational amplifiers $OP_3$ and $OP_4$ are not indispensable, but analog switches with high breakdown strength are expensive so that these amplifiers were made use of in the present embodiment.

Next, the structure and the method of manufacture of the MIM-LCD panel used in the present embodiment will be described.

Referring to FIG. 1, the lower glass substrate 1 is covered with a glass protective film 2 of $Ta_2O_5$, $SiO_2$ or the like. The protective film 2 is not indispensable so that it is possible to omit the covering. Next, after forming a lead electrode 3 and a salient electrode 11 on top it, there is formed an insulator layer 4.

Silicon nitride of the insulator layer 4 may be formed by various methods, but in the present embodiment, a layer of about 1000 Å thickness was formed by plasma CVD method that makes use a mixed gas of nitrogen gas, silane gas and hydrogen gas.

The material for the upper electrode 5 was chosen to be Cr which was formed on the insulator layer 4 by resistive heating method, and patternized by the ordinary photolithography. The lower transparent electrode 6 was chosen to be made of indium oxide-tin oxide (usually called ITO) which was formed on the insulator layer 4 by magnetic sputtering, and patternized by the ordinary photolighography.

The film formation on the upper glass substrate 7 and the patterning are almost identical to those of the ordinary simple multiplexed LCD. The upper glass substrate 7 is covered with a glass protective film 8 such as $SiO_2$, but the protective film 8 is not indispensable. The upper transparent electrode 9 is also made of indium oxide-tin oxide same as for the lower transparent electrode 6, and is formed by magnetic sputtering and patternized by the ordinary photolighography.

The lower glass substrate 1 and the upper glass substrate 7 are laminated via a spacer such as glass fiber, and sealed with an ordinary epoxy adhesive. The thickness of the cell was chosen to be 8 μm.

Both of the glass substrates 1 and 7 were subjected to an orientation treatment by rubbing. In that case, an orientation treatment film of polyimide or the like is often applied to them, but it is omitted in FIG. 1 since it is not indispensable.

A quantity of ZLI-1565 (manufactured by Merck Corp.) which is a twisted nematic liquid crystal was injected to the cell through an injection hole to form a liquid crystal layer 10. By sealing the injection hole with an adhesive a TFD-LCD panel was completed.

FIG. 2 shows an element pattern of one pixel on the lower glass substrate 1. As shown, the lower transparent electrode 6 is separated for each pixel. The front face of the electrode 3 is covered with the insulator layer 4 by anodic oxidation, and a small projection is formed extending from the lead electrode corresponding to each pixel. This salient electrode 11 intersects the upper electrode 5, and the intersecting part constitutes a MIM.

FIG. 3 shows a portion of the structure of the TFD-LCD panel of the present embodiment. As shown, pixels are arranged in matrix form on the lower glass substrate 1, the lead electrode 3 extends in the vertical direction, and forms a terminal part 12 at its end part. The upper transparent electrode 9 on the upper glass substrate 7 shown in FIG. 1 is formed in the shape of a belt joining the pixels in the horizontal direction as shown in FIG. 3. The shape of the upper transparent electrode 9 is substantially the same as that of the electrode of the simple multiplex-driven LCD.

When the voltage application method of FIG. 4 is adapted to the LCD with a structure as shown in FIG. 1 to FIG. 3, the upper transparent electrode 9 becomes a scan signal line and the data electrode 3 becomes a data signal line.

When the TFD-LCD used in the present embodiment adopted the driving method indicated in FIG. 5, there was obtained a display with maximum contrast for $V_P = 19$ V and bias ratio of 9, but there occurred flickers in the display. It was easy to adjust to eliminate flickers completely by changing $V_P$ between the frames (namely, $V_P$ and $V_P'$) as in the driving method shown in FIG. 7 after making flickers to be conspicuous in half-tone display by taking $V_P$ in the range of 15 to 17 V. At that time, it was found that $V_P=14.3$ V, $V_P'=17$ V so that the optimum ratio for display ($=V_P/V_P'$) was 0.842. Here, the bias ratio was a constant value 9 for the positive and the negative frames. In particular, realization of a display with no flickers was especially easy to accomplish when a display is adopted in which the entire screen is covered with selected pixels (that is, it is in the on-state across the board).

A high contrast display with contrast ratio greater than 20, no crosstalks and absolutely no flickers was obtained by raising the driving voltages to $V_P=16$ V and $V_P'=19$ V while keeping the bias ratio, namely, the ratio of $V_P$ to $V_P'$, constant.

Second Embodiment

The half-tone display was achieved by adopting the method of modulating the time width of the data signal for a selected pixel (namely, the pulse width modulation system). That is, 16 gradations were realized by digitizing a video signal by means of a 4-bit A/D converter, and varying the pulse width in accordance with the contrast curve of the liquid crystal.

By further increasing the bit number of the A/D converter, it became possible to obtain higher level of gradation.

It should be mentioned that in both cases of the embodiments described in the above, the value of $V_P/V_P'$ was determined by visually adjusting the screen of the liquid crystal display so as to eliminate the flickers.

Moreover, it should be noted that examples in which only silicon nitride MIM was used for the nonlinear resistance element were presented in the above embodiments. However, substantially the same display capability as in the above and having no flickers can also be obtained by the use of a MIM with other material, and a diode ring and a back-to-back diode as the nonlinear resistance element.

We claim:

1. A liquid crystal display comprising:
 a plurality of lower electrodes arranged in a matrix form on a substrate;
 thin film diodes connected respectively to said lower electrodes;
 a plurality of columns of lead electrodes connected respectively to said lower electrodes in each column via said respective thin film diodes;
 a plurality of rows of upper electrodes provided respectively over said lower electrodes in each row, one of said upper electrode and said lead electrode serving as a scan line;
 a liquid crystal layer inserted between said lower electrodes and said upper electrodes; and
 driving means for applying a signal between said lead electrode and said upper electrode, the polarity of said signal being inverted for every predetermined number of scanning lines and an absolute value of said signal being different for the positive polarity and for the negative polarity, wherein said driving means includes:
  control means for generating a frame signal;
  a first voltage generating means for generating first and second voltages in response to said frame signal, said first voltage and said second voltage being different;
  a second voltage generating means for generating first and second scan signals and first and second data signals in response to said first voltage, as well third and fourth scan signals and third and fourth data signals in response to said second voltage, said first and said third scan signals being signals that select said scan lines, said second and said fourth scan signals being signals that do not select said scan lines, said first and said third data signals being signals that select said pixels, said second and said fourth data signals being signals that do not select said pixels, the sign of a first signal voltage obtained by subtracting said first data signal from said first scan signal being opposite to the sign of a second signal voltage obtained by subtracting said third data signal from said third scan signal, and the absolute value of said first signal voltage being different from the absolute value of said second signal voltage;
  scan signal supplying mans for supplying said scan signal to one of said upper electrode and said lead electrode that is used as said scan line in response to said frame signal; and
  data signal supplying means for applying said data signal to the other of said upper electrode and said lead electrode that is used as said data line in response to said frame signal.

2. A liquid crystal display as claimed in claim 1, wherein said polarity is inverted for each frame.

3. A liquid crystal display as claimed in claim 1, wherein said polarity is changed every one scanning line.

4. A liquid crystal display as claimed in claim 1, wherein said polarity is changed every two scanning lines.

5. A liquid crystal display as claimed in claim 1, wherein the ratio of the absolute values of said signal applied by said driving means is such a ratio that causes the absolute value of the voltage that is applied to said liquid crystal layer to be equal for both the positive polarity and the negative polarity.

6. A liquid crystal display as claimed in claim 1, wherein said first voltage generating means including:
 a first power supply for supplying a first supply voltage;
 a second power supply for supplying a second supply voltage;
 a third voltage generating means for generating a third voltage from said first supply voltage and said second supply voltage;
 a first terminal connected to an output terminal of said third voltage generating means for receiving said third voltage;
 fourth voltage generating means connected between said output terminal of said third voltage generating means and said second power supply for generating a fourth voltage which is different from said third voltage;
 a second terminal connected to an output terminal of said fourth voltage generating means for receiving said fourth voltage; and
 fifth voltage generating means for switching between said first terminal and second terminal in response to said frame signal and generating said first and said second voltages from said third and said fourth voltages, respectively.

7. A liquid crystal display comprising:

a plurality of lower electrodes arranged in a matrix form on a substrate;

thin film diodes connected respectively to said lower electrodes;

a plurality of columns of lead electrodes connected respectively to said lower electrodes in each column via said respective thin film diodes;

a plurality of rows of upper electrodes provided respectively over said lower electrodes in each row, one of said upper electrodes and said lead electrode serving as a scan line;

a liquid crystal layer inserted between said lower electrodes and said upper electrode; and driving means for supplying a signal between said lead electrode and said upper electrode, the polarity of said signal being inverted for every predetermined number of scanning lines, an absolute valve of said signal being different for the positive polarity and for the negative polarity, and the ratio of the absolute values of said signal being such a ratio that causes the absolute value of the voltage that is applied to said liquid crystal layer to be equal for both of the positive polarity and the negative polarity.

8. A liquid crystal display as claimed in claim 7, wherein said polarity is inverted for each frame.

9. A liquid crystal display as claimed in claim 7, wherein said polarity is changed every one scanning line.

10. A liquid crystal display as claimed in claim 7, wherein said polarity is changed every two scanning lines.

11. A liquid crystal display comprising:

a plurality of rows of scan lines;

a plurality of columns of data lines that intersect said plurality of rows of scan lines, the intersections of said scan lines and said data lines being arranged in lattice form;

liquid crystal display pixels provided respectively in the vicinity of each of said intersection, each of said liquid crystal display pixels including a nonlinear resistance element connected to said data line, a lower electrode connected to said nonlinear resistance element, and a liquid crystal provided between said scan line and said lower electrode;

scan signal supplying means for supplying a first, second, third and fourth scan signals to said scan lines, said first and third scan signals being signals that select said scan lines and said second and fourth scan signals being signals that do not select said scan lines; and data signal supplying means for supplying a first, second, third and fourth data signals to said data lines, said first and third data signals being signals that select said liquid crystal display pixels, said second and fourth data signals being signals that do not select said liquid crystal display pixels, the sign of a first signal voltage obtained by subtracting said first data signal from said first scan signal being opposite to the sign of a second signal voltage obtained by subtracting said third data signal from said third scan signal, the absolute value of said first signal voltage being different from the absolute value of said second signal voltage, said first and second scan signals and said first and second data signals being supplied in response to a fifth scan signal that scans a predetermined number of first scan lines, said third and fourth scan signals and said third and fourth data signals being supplied in response to a sixth scan signal that scans a predetermined number of second scan lines, and said fifth scan signal and said sixth scan signal being supplied alternately.

* * * * *